Feb. 7, 1961  S B. TAYLOR  2,970,442
ENGINE SYNCHRONIZING MECHANISM WITH HYDRAULIC ACTUATION
Filed July 9, 1958

INVENTOR.
S BLACKWELL TAYLOR
BY
John N. Wolfram
ATTORNEY

United States Patent Office 2,970,442
Patented Feb. 7, 1961

2,970,442

ENGINE SYNCHRONIZING MECHANISM WITH HYDRAULIC ACTUATION

S Blackwell Taylor, Cleveland, Ohio
(21850 S. Woodland Road, Shaker Heights 22, Ohio)

Filed July 9, 1958, Ser. No. 747,469

10 Claims. (Cl. 60—54.6)

This invention relates to speed synchronizers for engines and more particularly to a mechanism for controlling the speed of a slave engine according to the speed of a master engine.

It is an object of the invention to provide an engine speed synchronizing means which employs a hydraulic actuator and servo motor for actuating a speed control device for the slave engine to increase or decrease the speed thereof whenever the speed is lesser or greater than the speed of the master engine.

It is another object to provide an engine speed synchronizing means having means for detecting differential speeds between two engines and employing a hydraulic actuator which is directly responsive to such differential speed detector for operating a hydraulic servo motor which in turn operates a speed control device for one of the engines to bring it into synchronism with the other engine.

Another object to provide a speed synchronizer for a master engine and a slave engine in which cumbersome rods and linkages between a speed differential responsive device and a speed control device for the slave engine are eliminated and an easily installed and maintained hydraulic impulse mechanism is substituted.

Another object is to provide an engine speed synchronizing device of the type described in which a means is provided for disconnecting the device from the engines so as to render the same inoperative, the disconnecting means being automatically operable under predetermined conditions and/or being manually controllable.

Other objects of the invention will be apparent from the following description and from the drawing in which.

Figures 1, 2:
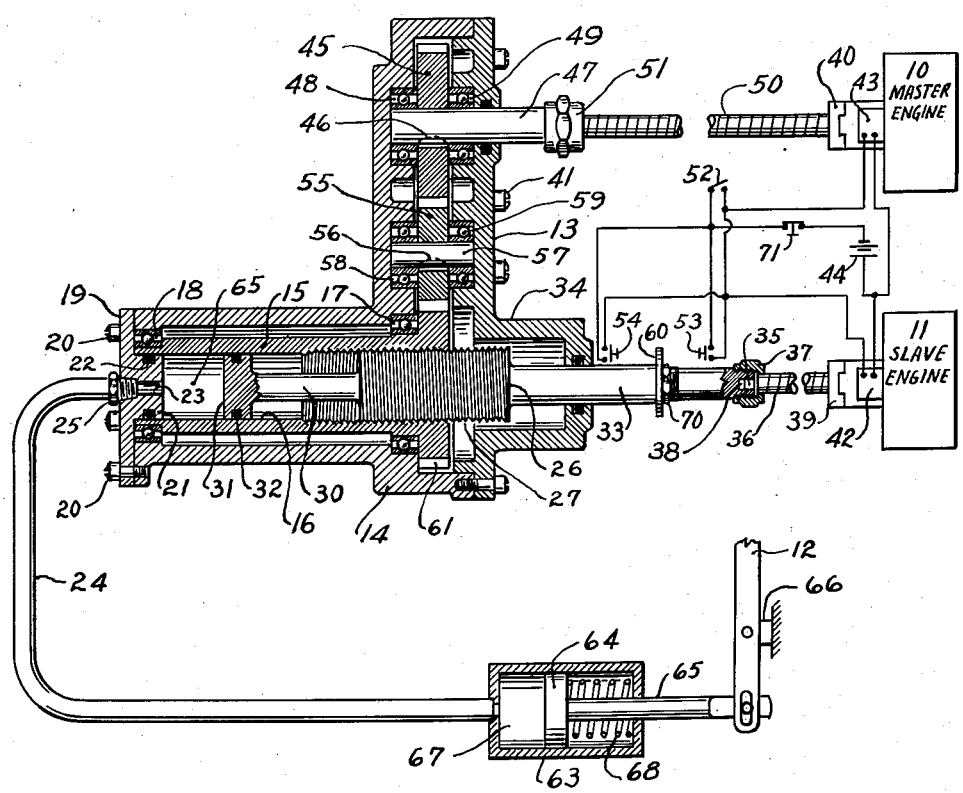
Figure 1 is a semi-diagrammatic illustration of the synchronizing arrangement and with some of the parts shown in cross section.
Figure 2 is a fragmentary view of an optional form of the device.

In the synchronizing arrangement illustrated, either engine 10 may be the master engine whose speed may be controlled by an operator or by some automatic means and engine 11 is a slave engine whose speed is controlled by the synchronizing mechanism according to the speed of the master engine, or 11 may be the master engine and 10 the slave engine. It will be understood that if engine 10 is the master engine, the lever 12 is part of the throttle or other speed control device for the engine 11, whereas if engine 11 is the master engine, the lever 12 is part of the throttle or other speed control device of the engine 10. In the following description it will be assumed that engine 10 is the master engine and the lever 12 is part of the speed control device of the slave engine 11.

The speed synchronizing mechanism includes a combination differential speed detector and hydraulic actuator generally designated as 13. This unit has a base or housing member 14 in which a cylindrical member 15 is rotatably mounted. The cylindrical member 15 has a cylindrical bore 16 which is threaded at one end. The cylindrical member 15 is journalled by bearings 17 and 18 in the housing 14 for rotation therein. One end of the bore 16 is closed by a plug 19 which is fixed to the housing 14 by screws 20 and which has an extension 21 which closely fits the bore 16 and is sealed thereagainst by a packing 22. A duct 23 in the plug 19 leads from the bore 16 to the exterior of the cylindrical member 15 and communicates with a pipe 24 connected to the plug 19 by a suitable coupling 25.

The bearings 17 and 18 are preferably press fitted within the housing 14 and onto the cylindrical member 15 so that the latter will be restrained from longitudinal movement along the axis of the threaded bore 16.

A member 26 has a central threaded section 27 which is threaded into a cylindrical member 15. Extending from the threaded central section 27 is a rod 30 which terminates in a piston 31 having a close sliding fit within the bore 16 and which is sealed thereagainst by a packing 32.

The cylindrical member 15, the threaded member 26, and plug 19 cooperate to form a hollow structure which includes a sealed fluid chamber 65. The piston 31 forms a movable wall of the chamber which is sealed by packing 32 in the piston.

At the other end of the threaded member 26 there is a shaft 33 which extends through a closure cap 34 for the housing 14. The outer end of the shaft 33 has a groove 38 to receive a tongue 35 on a flexible shaft 36. The shafts 33 and 36 are secured together by a suitable coupling 37. The flexible shaft 36 is connected to the slave engine 11 for rotation thereby by means of a clutch 39.

Mounted in the housing 14 is a driving gear 45 having a keyed connection 46 with a shaft 47. The latter is journalled for rotation within the housing 14 and cap 34 by bearings 48 and 49 and one end of the shaft extends through the closure cap 34 and is connected to a flexible shaft 50 by a coupling 51 similar to that used in connecting shaft 33 to flexible shaft 36. The flexible shaft 50 has its other end connected to the master engine 10 for rotation thereby, by means of a clutch 40.

The driving gear 45 meshes with an idler gear 55 which has a keyed connection 56 to a shaft 57. The latter is journalled for rotation within the housing 14 and closure cap 34 by bearings 58 and 59.

The idler gear 55 also meshes with a driven gear 61 formed integrally on the cylindrical member 15. Each of the gears 45, 55, and 61 has a fixed longitudinal position within the housing.

The pipe 24 leads from the plug 19 to one end of a conventional hydraulic servo motor 63, the latter being shown in diagrammatic fashion. The servo motor has a piston 64 and a piston rod 65 which is attached to a lever 12 which may have one end pivotally connected to a suitable stationary support 66 and whose other end operates the throttle or other speed control device for the slave engine 11. The servo motor 63 operates in a well known manner, the rod 65 being extended when fluid under pressure is forced into the chamber 67 and retracted under the influence of the spring 68 when fluid is permitted to exhaust from the chamber 67.

The clutches 39 and 40 are operable by solenoids 42 and 43, respectively, and may be of conventional well known types. The solenoids may be energized by a battery 44. It is preferable that the clutches be so arranged that they are engaged when the solenoid is de-energized and disengaged when the solenoid is energized, although the reverse arrangement may be provided if so desired. In the latter case the open and closed positions of the various switches are reversed from those described herein for the various operational phases.

In addition, automatic operation of the clutches by the solenoids is provided by means of switches 53 and 54. These switches are operated by contact with a collar 60 attached to the shaft 33 by a locknut 70 or other suitable means. They are normally open and when closed by contact with the collar 60 cause the solenoids 42 and 43 to become energized for disengaging the clutches 39 and 40. If desired, the caps 34 may be extended farther along the shaft 33 to enclose the collar 60 and switches 53 and 54.

A normally closed manually operated overriding switch 71 is provided so that the solenoids may be de-energized for engaging the clutches even though either of the switches 53 or 54 are closed. Also, a manually controlled normally open switch 52 is provided for causing engagement or disengagement of the clutches.

In operation, the master engine 10 has its speed controlled in any desired manner, such as by a manual or automatic pilot controlled throttle. While the solenoid 43 is de-energized so that the clutch 40 is engaged, engine 10 rotates the flexible shaft 50 in any desired ratio to the speed of the master engine. The flexible shaft 50 drives the shaft 47 which in turn rotates the driving gear 45. The latter rotates the idler gear 55 which in turn rotates the driven gear 61 and hence the cylindrical member 15. Due to the interposition of the idler gear 55, the cylindrical member 15 rotates in the same direction as the flexible shaft 50.

At the same time, the flexible shaft 36 is rotated by the slave engine 11 while solenoid 42 is de-energized and clutch 39 is engaged and in turn rotates the threaded member 26. The flexible shaft 36 rotates in the same direction as the flexible shaft 50 and hence the threaded member 26 rotates in the same direction as the cylindrical member 15. The flexible shaft 36 preferably rotates with the same ratio to the speed of a slave engine 11 as the flexible shaft 50 with respect to the master engine 10. With this arrangement, the driving gear 45 has a one to one ratio with the driven gear 61 and hence the threaded member 26 will rotate at the same speed as the cylindrical member 15 when the master and slave engine are rotating at identical speeds. If the speed ratio of the flexible shaft 50 with respect to the master engine 10 is different than the ratio for the flexible shaft 36 with respect to the slave engine 11, a corresponding ratio must be provided between the driven gear 61 and the driving gear 45 in order to have the cylindrical member 15 and the threaded member 26 rotate at the same speed when the master and slave engine are rotating at identical speeds.

When the two engines are rotating at the same speed, the threaded member 26 retains its longitudinal position within the cylindrical member 15 and hence the piston 31 remains in a fixed longitudinal position within the bore 16. As a result, the servo motor piston 64 is also maintained in a fixed position and it in turn maintains the throttle lever 12 in a set position.

If the speed of the master engine drops below that of the slave engine, the cylindrical member 15 will rotate at a slower speed than the threaded member 26 and, assuming a right handed threaded connection between members 26 and 15, the member 26 will thread itself leftwardly further into the cylindrical member 15. In doing so, the piston 31 forces some of the fluid from the chamber 65 through the pipe 24 into the servo motor chamber 67 to move the piston 64 rightwardly and the upper end of the lever 12 leftwardly. This will cause the speed control device operated by the lever 12 to decrease the speed of the slave engine 11 until such time that it is again in synchronism with the master engine, at which time the rotative speeds of the members 15 and 26 will again coincide and relative longitudinal motion therebetween will cease and the lever 12 will be held in a set position.

If the speed of the master engine is increased, the cylindrical member 15 will be rotated at a higher speed than the threaded member 26. If the threaded connection between the two members is formed with a right hand thread, the member 26 will start to unthread from the cylindrical member 15 and hence move longitudinally in a right hand direction as viewed in the drawing. This rectilinear movement is imparted to the piston 31 to increase the volume of the fluid chamber 65 which permits some of the fluid within the servo motor chamber 67 to be forced through the pipe 24 into the chamber 65 by the action of the spring 68. This moves the upper end of the lever 12 to the right to change the setting of the throttle or other speed control device for slave engine 11 in such a manner as to increase the speed thereof. When the speed of slave engine 11 catches up with that of master engine 10, the cylindrical member 15 and the threaded member 26 will again rotate at the same speed and the relative rectilinear motion therebetween will cease and the position of the lever 12 will again be maintained in a set position.

If the threaded connection between the members 15 and 26 is lefthanded, the direction of movement of the threaded member 26, piston 31, servo motor piston 64, and lever 12 will be reversed from that described above and such reverse movement of the lever 12 must be coordinated with the throttle to correspondingly properly increase or decrease the speed of the slave engine.

In the event the slave engine 11 gets out of synchronism with master engine 10 and for any reason is not able to achieve synchronism before member 26 has reached the end of its stroke in either direction as required for obtaining synchronism, the collar 60 will contact the corresponding switch 53 or 54 to energize the solenoids 42 and 43 and disengage the clutches 39 and 40. This protects the device against damage by stopping rotation of the parts 26 and 15 so as to prevent overtravel of the member 26.

If either of the switches 53 or 54 has thus been closed by collar 60, the device may be made operable again by opening the overriding switch 71 until the collar 60 moves away from the particular switch 53 or 54 and allows the same to open. The switches 53 and 54 may be mounted adjacent the device 13 on any suitable base or support, or may be mounted on or within the device 13.

It may be desirable at other times, as when starting the engines, or when operating only one engine, to render the speed synchronizing device inoperable. This is accomplished by closing the manual switch 52 to energize the solenoids and hence disengage the clutches 39 and 40.

Figure 2 shows a fragmentary portion of an optional form of the device 13 in which the idler gear 55 of Figure 1 is omitted. In such case the shaft 47a must be so connected to the master engine 10 that it rotates in the opposite direction of shaft 33. This may be accomplished in various ways, such as by gearing at the power take off for the engine 10, locating the power take off at the opposite end of the engine 10, extending the shaft 47a through the housing 14a and driving the shaft from such extension, etc.

Although the embodiment of the invention shown in the drawing accommodates only one slave engine, it will be understood that the invention can be readily modified to control two or more engines with respect to a master engine. Thus, for each additional engine to be controlled, another idler gear similar to gear 55 may be provided to mesh with driving gear 45 and drive another cylindrical member corresponding to member 15, which in turn will function with another threaded member corresponding to member 26 to operate another servo motor corresponding to motor 63 for controlling the throttle of the additional engine.

Obviously, additional changes may be made in the particular form of the invention without departing from the inventive concepts covered by the following claims.

I claim:

1. A hydraulic actuator comprising a first member connectible to an engine for rotation thereby, a second member connectible to another engine for rotation thereby, said members forming a sealed chamber for fluid, one of said members forming a movable wall of said chamber, said members being cooperatively arranged so as to move relative to each other in response to a differential in their rotative speeds to cause said wall to move relative to the other member for changing the volume of said chamber in accordance with said speed differential, and a duct leading from said chamber through which fluid may be introduced into or expelled from said chamber as the volume of the chamber is varied.

2. A hydraulic actuator in accordance with claim 1 in which the cooperative engagement of the first and second members for movement relative to each other in response to a differential in their rotative speeds comprises a threaded interengagement of said members.

3. A hydraulic actuator in accordance with claim 1 in which the cooperative engagement of the first and second members for movement relative to each other in response to a differential in their rotative speeds comprises a threaded interengagement of said members and the chamber and the movable wall are coaxial one with the other and with said threaded interengagement of said members.

4. A hydraulic actuator in accordance with claim 1 in which the chamber is cylindrical and the movable wall is in the form of a cylindrical piston carried by one of the members and movable in the chamber.

5. A hydraulic actuator comprising a housing, a cylindrical member rotatably supported in said housing and having a bore therein providing a chamber for fluid, closure means for one end of the chamber, a second member rotatably supported by said cylindrical member and having a portion in sealed engagement therewith, said portion providing a movable wall at the other end of said chamber, a duct through said closure means and leading from said chamber to the exterior of said cylindrical member, means associated with each of said members whereby said members may be rotated independently of each other, means interconnecting said members whereby a differential in their speeds of rotation when rotating in the same direction will cause relative rectilinear movement therebetween whereby said movable wall will move toward or away from said chamber to decrease or increase the volume of said chamber depending upon which member is rotating the fastest.

6. A hydraulic actuator in accordance with claim 5 in which said interconnecting means comprises a threaded engagement between said members at one end of said cylindrical member.

7. A hydraulic actuator in accordance with claim 5 in which said closure means is non-rotatably attached to said housing.

8. A hydraulic actuator in accordance with claim 5 in which said cylindrical member is supported in said housing for substantially no movement with respect to said housing along the axis of rotation of said cylindrical member.

9. A hydraulic actuator in accordance with claim 6 in which said cylindrical member is fixed against movement along its axis of rotation with respect to said housing and said second member has a shaft extending from said housing, said shaft being extendable and retractable with respect to said housing as said second member moves rectilinearly relative to said cylindrical member.

10. A hydraulic actuator comprising a housing, a cylindrical member rotatably supported in said housing in a fixed position longitudinally of the axis of rotation, said cylindrical member having a bore therein, one end of said bore being closed by a plug which is non-rotatably attached to said housing, the other end of the bore being threaded and an intermediate portion of the bore being smooth, a second member rotatably mounted within the housing and having a central portion in threaded engagement with said threaded bore so as to be movable longitudinally of said cylindrical member when said members are rotated at different speeds, a piston carried by said second member and located within said intermediate smooth bore portion, said piston being spaced from said plug and sealed with respect to said smooth bore portion so as to form a sealed chamber for fluid within said bore and constituting a movable wall for said chamber to increase or decrease the volume thereof, a duct through said plug in communication with said chamber for permitting expulsion or admission of fluid from or to said chamber as the volume of the latter is decreased or increased, a driven gear carried by the cylindrical member whereby the latter may be rotated, an idler gear journalled in said housing and in mesh with said driven gear, a driving gear journalled in said housing and in mesh with said idler gear, said driving gear having a shaft extending from said housing whereby said driving gear may be rotated, said idler and driving gears having a fixed longitudinal position within said housing, said second member having a shaft whereby said second member may be rotated, said shaft extending from said threaded central section to the exterior of the housing, said piston being longitudinally movable with said second member for decreasing or increasing the volume of said chamber.

References Cited in the file of this patent

UNITED STATES PATENTS

| Number | Name | Date |
|---|---|---|
| 1,465,091 | Prince | Aug. 14, 1923 |
| 2,144,429 | Martin | Jan. 17, 1939 |
| 2,159,319 | Cartwright | May 23, 1939 |
| 2,264,675 | Nardone | Dec. 2, 1941 |
| 2,269,332 | Bench et al. | Jan. 6, 1942 |
| 2,307,334 | Peek | Jan. 5, 1943 |
| 2,344,473 | Stevenson et al. | Mar. 14, 1944 |
| 2,380,575 | Brown | July 31, 1945 |
| 2,446,393 | Russell | Aug. 3, 1948 |
| 2,553,826 | Martin | May 22, 1951 |
| 2,599,885 | Benua | June 10, 1952 |
| 2,623,387 | Pitcher et al. | Dec. 30, 1952 |
| 2,628,607 | Newell | Feb. 17, 1953 |
| 2,782,601 | Hamilton | Feb. 26, 1957 |